No. 699,418. Patented May 6, 1902.
R. B. SEARS.
EGG PRESERVING SAFE.
(Application filed Sept. 23, 1901.)
(No Model.)

UNITED STATES PATENT OFFICE.

ROBERT BRUCE SEARS, OF SACRAMENTO, CALIFORNIA, ASSIGNOR TO H. C. MUDDOX, OF SACRAMENTO, CALIFORNIA.

EGG-PRESERVING SAFE.

SPECIFICATION forming part of Letters Patent No. 699,418, dated May 6, 1902.

Application filed September 23, 1901. Serial No. 76,192. (No model.)

*To all whom it may concern:*

Be it known that I, ROBERT BRUCE SEARS, a citizen of the United States, residing at Sacramento, county of Sacramento, State of California, have invented an Improvement in Egg-Safes; and I hereby declare the following to be a full, clear, and exact description of the same.

My invention relates to a containing device for eggs and a means for turning and refrigerating the same.

It consists in details of construction, which will be more fully explained by reference to the accompanying drawings, in which—

Figure 1:
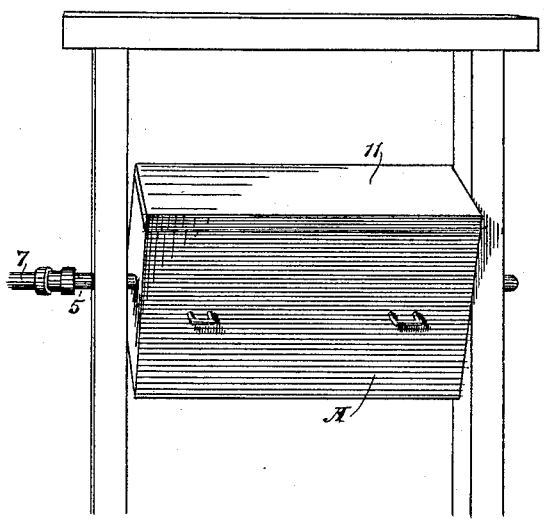
Figure 2:
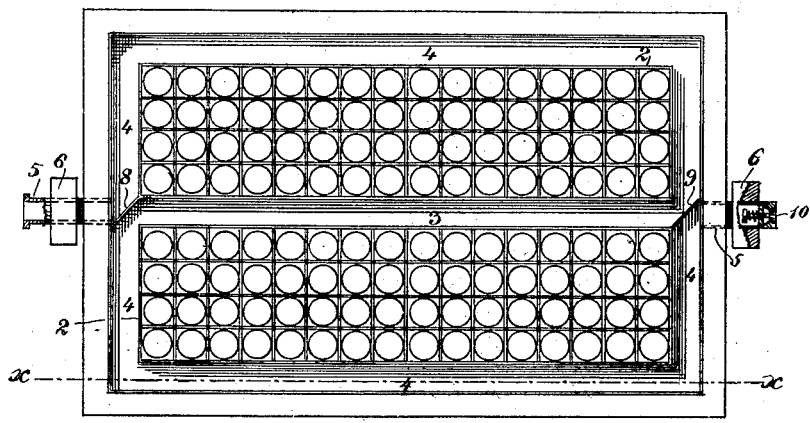
Figure 3:
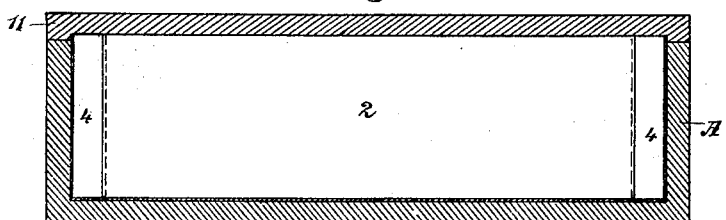

Figure 1 is a view of the apparatus. Fig. 2 is a top view of the same. Fig. 3 is a vertical section on line $x\ x$ of Fig. 2.

The object of my invention is to provide an apparatus in which a large quantity of eggs may be contained in individual compartments and to so mount said apparatus that it can be revolved at intervals, so as to prevent the yolks of the eggs from settling to one side, and in conjunction therewith a means for introducing and circulating cold air for the purpose of reducing the temperature and maintaining it at a low degree.

As shown in the accompanying drawings, A is an exterior case, having the interior compartment boxes or cases 2 separated by an open channel or space, as at 3, and having similar open channels or spaces 4 between the sides of the outer and inner cases and also between the ends thereof. The inner cases 2 are provided with separate compartments, made of pasteboard or other similar or well-known material, so that eggs can be placed in the compartments until the cases are full, each egg having its own individual compartment, within which it is held in position and separated from all the others. The outer case is provided with trunnions 5 at opposite ends, and these trunnions are journaled and turnable in the uprights 6 of a suitable framework, so that the cases when filled and the outer compartment in which they are contained may be revolved upon the trunnions. After the inner cases have been filled a cover 11 is placed upon the outer case, which fitting closely upon the inner ones prevents the eggs from being disturbed during the revolution.

The device thus mounted may be revolved by hand or by any suitable device, so that the eggs can be turned at intervals, and the eggs being turned with the case will present different sides uppermost at each point of the revolution, and the yokes will thus be prevented from settling to the bottom and the eggs from deterioration on this account.

In order to preserve the eggs at a low temperature, the shaft or trunnion 5 at one end is made hollow and is connected by a suitable coupling with an induction pipe or hose 7. This may be connected with any source from which cold air can be obtained, and any air-forcing mechanism (not here shown) may be employed to produce a current of air either continuous or intermittent.

In order to properly circulate the air through the apparatus, I have shown gates 8 and 9 at opposite ends of the outer casing and so arranged as to stand diagonally between the outer casing and the angles of the inner cases 2. These gates are so placed that air entering through the inlet shaft or trunnion 5 is diverted by the gate 8 and caused to pass around the outside of one of the boxes 2, between it and the walls of the outer case. Thence at the opposite end the gate 9 again directs the air so that it passes through the channel 3 between the cases 2, and arriving at the inlet end the position of the gate is such that the air is again diverted around the second box 2 and through the passage 4, between it and the outer case, finally arriving at the opposite end, where it passes out through the hollow shaft or trunnion 5 at that end.

In order to prevent a too free escape of the cold air or the admission of warm air from the outside, I have shown a spring-pressed valve at 10, which is normally closed with a light pressure; but this pressure is easily overcome by that which forces the air into the apparatus, so that the air can be readily changed within the apparatus at any time, the pressure being sufficient to open the valve 10 and allow the air within the case to be displaced by the fresh air which is being introduced.

As the cases are made of wood or some nonconducting material, it will be obvious that when a charge of air has been introduced into the case, the valve closing so as to prevent any escape therefrom, the air will remain at a low temperature for a considerable time, and thus the charging may be made intermittent. The case being once charged can remain in that condition for a considerable time, and when the temperature begins to rise a fresh charge can be introduced, expelling that which is already in the case through the valve-opening at 10, the latter closing whenever the pressure at the inlet end ceases.

Having thus described my invention, what I claim, and desire to secure by Letters Patent, is—

1. The combination in an egg-safe of an outer case having journal-shafts at the center of its ends and supports therefor, interior cases having individual compartments adapted to contain eggs or the like said inner cases separated from each other and from the inner walls of the outer case to form intermediate channels, and means whereby air may be introduced and circulated through said channels.

2. The combination in an egg-safe of an outer case having tubular shafts or journals at the center of its ends, and supports upon which they are turnable, interior cases having individual compartments adapted to contain and separate the eggs or the like, said interior cases separated from each other and from the outer case to form channels between the interior cases and between them and the outer case, and gates whereby the air admitted to said channels is diverted and caused to pass around the inner cases between the inlet and outlet passages.

3. An apparatus for containing and preserving eggs and the like, consisting of an exterior case, having tubular journals centrally fixed to the opposite ends, supports therefor, interior cases separated from each other and from the outer case to form channels or spaces between said interior cases and the outer case, said interior cases having separate compartments in which the contents are placed, means whereby air may be introduced through one of the hollow journal-shafts, a valve-controlled exit and gates interposed between the inner and outer cases whereby the current of air is directed successively around the interior cases.

In witness whereof I have hereunto set my hand.

ROBERT BRUCE SEARS.

Witnesses:
E. J. JACKSON,
H. C. MUDDOX.